UNITED STATES PATENT OFFICE.

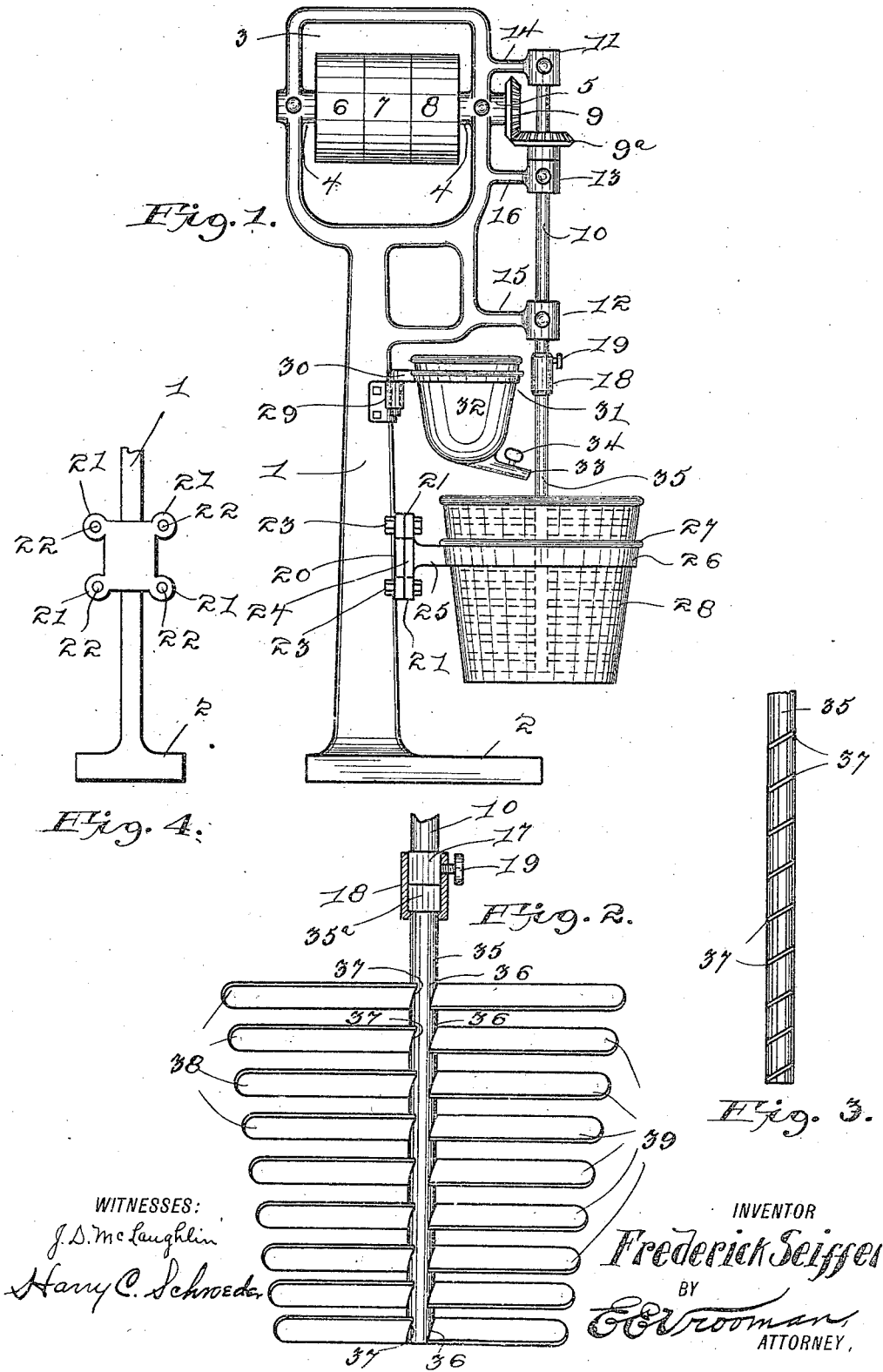

FREDERICK SEIFFERT, OF OAKLAND, CALIFORNIA.

DOUGH-MIXING MACHINE.

949,132.  Specification of Letters Patent.  Patented Feb. 15, 1910.

Application filed June 19, 1909. Serial No. 503,224.

*To all whom it may concern:*

Be it known that I, FREDERICK SEIFFERT, citizen of the United States, residing at Oakland, in the county of Alameda and State of California, have invented certain new and useful Improvements in Dough-Mixing Machines, of which the following is a specification, reference being had therein to the accompanying drawing.

This invention relates to batter mixing machines, and the principal object of the invention is to provide a machine of the type specified which will assure of the batter being thoroughly and smoothly mixed without danger of the grain of the batter or dough being cut.

In carrying out the objects of the invention generally stated above it is contemplated equipping a batter or dough mixing machine with a novel type of paddles which are arranged so as to impart a spiral movement to the material being acted upon, the paddles being spaced relatively so as to exert a greater force upon the material where it is dense, or thick, than at its thinner portion.

In connection with the foregoing the invention also contemplates employing a novel type of feeding means for flavoring extracts and the like, the flow of which may be regulated and directed to various parts of the receptacle in which the dough or batter is being mixed.

The invention also contemplates employing means whereby the machine may be operated either forwardly or reversed and also rendered idle. And finally the invention contemplates a novel arrangement of shafting and bearings therefor by means of which the stirrers or paddles are operated with the minimum of power.

In the practical application of a machine capable of performing the above stated functions it will, of course, be understood that the essential features thereof are necessarily susceptible of changes in details and structural arrangements, but one preferred and efficient embodiment of the same is shown in the accompanying drawings, wherein—

Figure 1 is a view in side elevation of the improved mixing machine. Fig. 2 is a detail elevation of the paddles or stirrers and their shaft. Fig. 3 is a detail view of the paddle shaft, the paddles being removed. Fig. 4 is a view in front elevation of a portion of the supporting standard of the machine showing the support thereon for the mixing receptacle.

Referring to said drawings by numerals 1 designates a vertically arranged supporting standard which is provided with a flat and elongated base 2 adapted to support the machine upon a floor or the like. The upper portion of the said standard carries a substantially rectangularly shaped, vertically arranged housing 3 which has inwardly projecting oppositely disposed intermediately arranged bearings 4 through which a shaft 5 projects. Said shaft 5 is the main power shaft of the machine and is equipped with three pulleys 6, 7 and 8, the pulley 6 being a forward one, the pulley 8 a reverse one, and the pulley 7 an idle one, by means of which the machine may have a belt connection with a motor or other suitable source of power. Said pulleys are of the conventional type, and hence their construction has not been shown in detail.

One end of the shaft 5 projects beyond one side of the housing 3 and has a bevel gear 9 fast thereon which is in mesh with a horizontally arranged bevel gear $9^a$ fast on a driving shaft 10 vertically arranged in upper, lower and intermediate bearings 11, 12 and 13, carried by horizontal arms 14, 15 and 16 projecting from said housing 3 and from said standard 1. The lower end of said driving shaft 10 projects beyond its bearing 12 and is squared as indicated at 17 for the reception of a coupling sleeve 18 which is squared internally and which is held to said squared end of the shaft 10 by means of the thumb screw 19.

The front face of the standard 1 at a point intermediate its base and the lower bearing arm 15, is provided with a flattened plate 20 having outstanding corners 21 provided with bolt openings 22 for the reception of fastening bolts 23 carried by the corners of a similar plate 24 from which projects a bracket arm 25 carrying a circular rest 26 the upper edge of which is rounded as indicated at 27. Said rest is of greater diameter at its top portion than at its bottom so as to adapt the same for a snug engagement with a tapering batter receptacle 28. A hinge 29 is carried by the standard 1 above the plate 20 to which is connected a bracket arm 30 of a circular rest or holder 31 for a receptacle 32 the bottom portion of which carries an outwardly projecting, slightly inclined discharge tube 33 which is controlled by a valve 34. The receptacle 32 is so arranged that its discharge tube will project over the batter or dough receptacle and deliver the contents of said receptacle 32 to said batter receptacle.

A paddle shaft 35 has a squared upper end 35ª which is engaged by the coupling sleeve 18 to hold said paddle shaft to the driving shaft 10, as shown in Fig. 3. The paddle shaft extends into the batter receptacle 28 and is provided with oppositely disposed rows of oblique slots 36—37, the slots of one row being reversely arranged relatively to the opposite row. Paddles project outwardly from the rows of slots 36—37, said paddles being designated by the numerals 38—39. As will be observed by reference to Figs. 2 and 3, the lower three slots of each row are somewhat closer together than the other slots, which arrangement brings the lower paddles closer together so that they may act with greater force upon the lower portion of the dough or batter, as said lower portion of the dough or batter is the thicker portion. The paddles are of graduated length, that is the upper ones are the longer and the lower ones the shorter, the arrangement in addition to adapting the paddles for use with a tapering receptacle, also contributes to a better spiral, or twisting stirring of the material in the receptacle, as will be obvious.

It will be seen from the foregoing that the present machine is one in which the additions to be made to the batter or dough may be delivered in predetermined quantities by means of the described valve-controlled discharge, and as the receptacle which holds said additions is pivotally mounted, the same may be moved relatively to the batter receptacle so that its contents may be directed to various parts thereof.

The batter receptacle and the receptacle for delivering to the batter receptacle may be readily removed from their supports for cleansing or other purposes, and the paddle shaft may be readily disconnected from the driving shaft for similar purposes, through the described coupling sleeve.

What I claim as my invention is:—

1. A machine of the character described comprising a base, a vertical standard mounted thereon, a bracket upon said standard and mounted at right angles therewith and carrying a rest, a batter receptacle seated in said rest, a second bracket hinged to said standard and carrying a rest, a delivery receptacle seated in said rest above said batter receptacle, a plurality of bearings extending at right angles from the upper part of said standard, a vertical driving shaft carried by said bearings, a paddle shaft connected to said vertical shaft, a plurality of paddles projecting from said paddle shaft, and means for operating said vertical driving shaft.

2. A machine of the character described comprising a batter receptacle, a paddle shaft projecting therein and provided with oppositely disposed rows of slots, the lower slots being closer together than the upper slots, and paddles projecting from said slots, said paddles being graduated in length.

3. A machine of the character described comprising a batter receptacle, a paddle shaft projecting therein and provided with oppositely disposed rows of oblique slots, said slots being reversely arranged, and the lower slots being closer together than the upper slots, and paddles projecting from said slots, said paddles being graduated in length.

In testimony whereof I hereunto affix my signature in presence of two witnesses.

FREDERICK SEIFFERT.

Witnesses:
H. C. SCHROEDER,
F. P. SCHROEDER.